(12) United States Patent
Park et al.

(10) Patent No.: US 8,402,202 B2
(45) Date of Patent: Mar. 19, 2013

(54) INPUT/OUTPUT CONTROL METHOD AND APPARATUS OPTIMIZED FOR FLASH MEMORY

(75) Inventors: Kyung-Min Park, Seoul (KR);
Nam-Yoon Woo, Suwon-si (KR);
Dong-Jun Shin, Hwaseong-si (KR);
Sun-Mi Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 736 days.

(21) Appl. No.: 12/146,247

(22) Filed: Jun. 25, 2008

(65) Prior Publication Data

US 2009/0037648 A1 Feb. 5, 2009

(30) Foreign Application Priority Data

Jul. 31, 2007 (KR) .................. 10-2007-0076980

(51) Int. Cl.
*G06F 13/00* (2006.01)
(52) U.S. Cl. .................. 711/103; 711/E12.053
(58) Field of Classification Search .................. 711/103
See application file for complete search history.

(56) References Cited

U.S. PATENT DOCUMENTS

| | | | |
|---|---|---|---|
| 5,860,083 A | 1/1999 | Sukegawa | |
| 6,826,650 B1 * | 11/2004 | Krantz et al. | 711/112 |
| 7,552,272 B2 * | 6/2009 | Gonzalez et al. | 711/103 |
| 7,743,203 B2 * | 6/2010 | France | 711/103 |
| 2002/0184436 A1 * | 12/2002 | Kim et al. | 711/103 |
| 2005/0015557 A1 * | 1/2005 | Wang et al. | 711/154 |
| 2005/0132127 A1 * | 6/2005 | Chung et al. | 711/103 |
| 2006/0161728 A1 * | 7/2006 | Bennett et al. | 711/103 |
| 2008/0104309 A1 * | 5/2008 | Cheon et al. | 711/103 |
| 2008/0270730 A1 * | 10/2008 | Lasser et al. | 711/170 |
| 2008/0288712 A1 * | 11/2008 | Cornwell et al. | 711/103 |

FOREIGN PATENT DOCUMENTS

| | | |
|---|---|---|
| JP | 2000-047832 A | 2/2000 |
| JP | 2001-075848 A | 3/2001 |
| JP | 2002-207572 A | 7/2002 |
| KR | 10-2004-0009926 A | 1/2004 |
| KR | 10-2004-0010517 A | 1/2004 |

OTHER PUBLICATIONS

Jesung Kim, Jong Min Kim, Sam H. Noh, Sang Lyul Min and Yookun Cho, A Space-Efficient Flash Translation Layer for Compactflash Systems, IEEE Transactions on Consumer Electronics, vol. 48, No. 2, May 2002, pp. 366-375.*

Park et al. "A Re-configurable FTL (Flash Translation Layer) Architecture for NAND Flash based Applications", 18th IEEE/IFIP Workshop on Rapid System Prototyping, May 2007.

* cited by examiner

*Primary Examiner* — Edward Dudek, Jr.
*Assistant Examiner* — Sean D Rossiter
(74) *Attorney, Agent, or Firm* — Sughrue Mion, PLLC

(57) ABSTRACT

An input/output control method and apparatus optimized for a flash memory, which can improve the performance of the flash memory. The input/output control method optimized for a flash memory includes determining whether a random write operation of data occurs in a flash memory, and successively writing randomly input data in a predetermined surplus region of the flash memory if it is judged that the random write operation occurs.

28 Claims, 10 Drawing Sheets

INPUT/OUTPUT CONTROL METHOD AND APPARATUS OPTIMIZED FOR FLASH MEMORY

CROSS-REFERENCE TO RELATED APPLICATION

This application claims priority from Korean Patent Application No. 10-2007-0076980 filed on Jul. 31, 2007 in the Korean Intellectual Property Office, the disclosure of which is incorporated herein in its entirety by reference.

BACKGROUND OF THE INVENTION

1. Field of the Invention

The present invention relates to a flash memory, and, more particularly, to an input/output control method and apparatus optimized for a flash memory that can improve the performance of the flash memory.

2. Description of the Related Art

Generally, an operating system (OS) uses a file system in order to manage data. Here, a file system has a logical structure that should be first constructed to manage a file. For example, a "format" command in Microsoft Windows refers to a process of creating and initializing such a file system. Only after the file system is created, a user can store or delete a file.

Diverse kinds of file systems exist depending on operation systems. For example, in the Windows series operating systems, File Allocation Table (FAT) file systems and the New Technology File System (NTFS) exist, while in the Unix/Linux series of operating systems, the Unix File System (UFS), Extended 2 (EXT2) file system, Extended 3 (EXT3) file system, and Journaled File System (JFS) exist.

A flash memory is a nonvolatile memory that can electrically delete and write data. Since the flash memory is light and durable against shock with low power consumption, it has been mainly used as a storage medium of portable information devices such as cellular phones, PDAs, digital cameras, and others. However, in order to write data in the flash memory, which is a kind of EEPROM, a delete operation should precede the write operation, and generally a delete unit is larger than a write unit. This feature of the flash memory makes it difficult to utilize a file system for a general hard disk as is the case when using the flash memory as an auxiliary storage device.

Accordingly, in order to conceal such limitations and to use the flash memory as a block device such as a hard disk, a flash translation layer, which is middleware between the file system and the flash memory, has been used. The flash translation layer maintains mapping information between a logical position of a virtual block device and a physical position of the flash memory, and when a write/read operation is requested with respect to a specified logical position, it translates the logical position into a physical position using the mapping information. Particularly, if a write operation for changing data in the logical position is requested, the flash translation layer electrically erases the physical position that corresponds to the logical position, and then performs rewriting or remapping of the logical position onto another physical position.

However, since the conventional file system and I/O scheduler are not optimized for the operation of the flash translation layer but are optimized for the hard disk, the performance of the flash memory deteriorates even if the flash translation layer is used. Particularly, when the flash memory performs a random write operation, its write efficiency deteriorates.

SUMMARY OF THE INVENTION

Accordingly, the present invention has been made to solve the above-mentioned problems occurring in the related art, and an aspect of the present invention is to provide an input/output control method and apparatus optimized for a flash memory that can improve the performance of the flash memory.

Additional advantages, aspects, and features of the invention will be set forth in part in the description which follows and in part will become apparent to those having ordinary skill in the art upon examination of the following or may be learned from practice of the invention.

In an aspect of the present invention, there is provided an input/output control method optimized for a flash memory, according to the present invention, which includes judging whether a random data write operation occurs in a flash memory; and successively writing randomly input data in a predetermined surplus region of the flash memory if it is judged that the random write operation occurs.

In another aspect of the present invention, there is provided an input/output control apparatus optimized for a flash memory, which includes a flash memory storing data therein; and a write operation control unit judging whether a random write operation occurs in the flash memory, and successively writing randomly input data in a predetermined surplus region of the flash memory if it is judged that the random write operation occurs.

BRIEF DESCRIPTION OF THE DRAWINGS

The above and other objects, features and advantages of the present invention will be apparent from the following detailed description taken in conjunction with the accompanying drawings, in which.

DETAILED DESCRIPTION OF EXEMPLARY EMBODIMENTS

Figure 1:
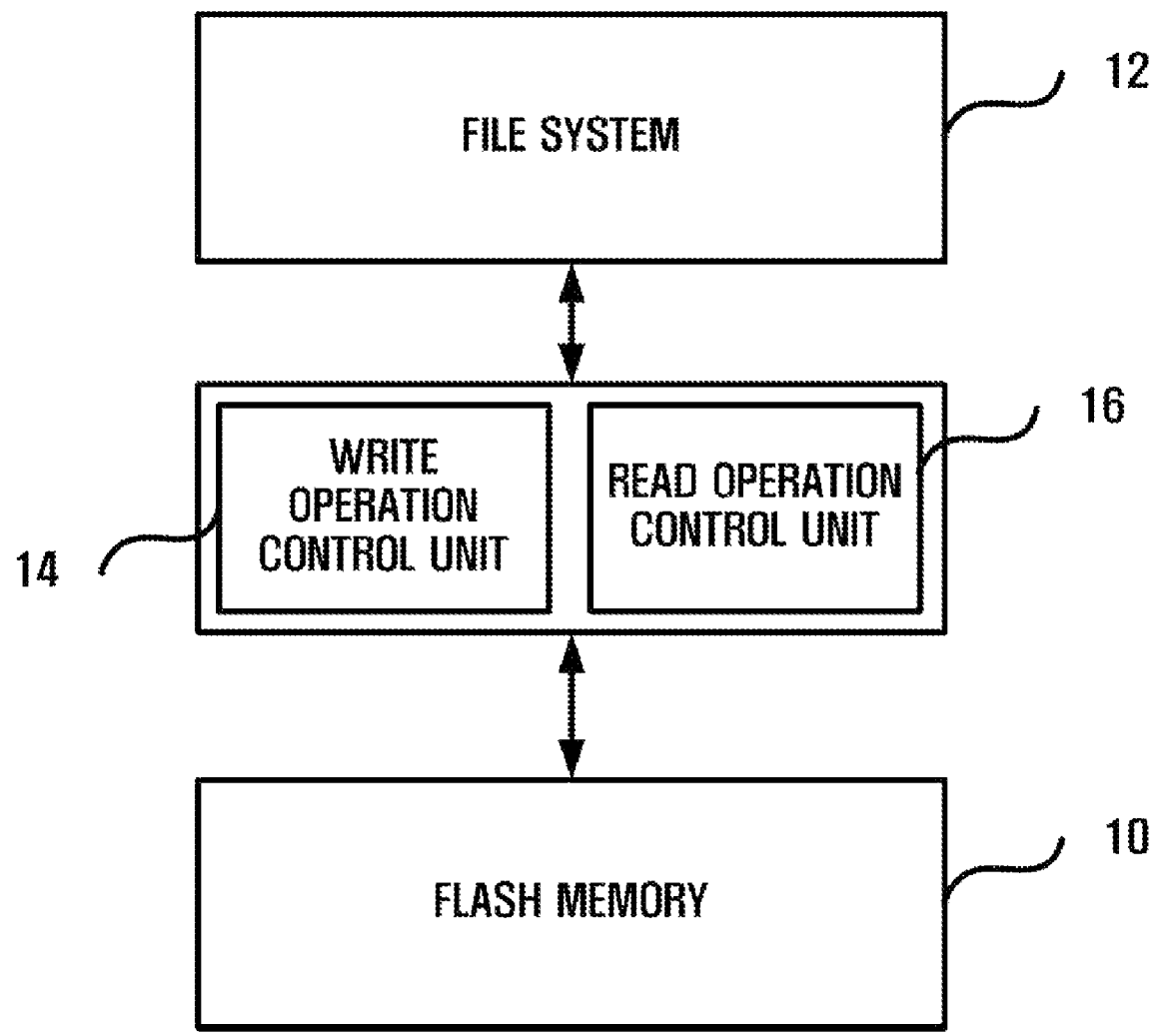
FIG. 1 is a view illustrating the construction of an input/output control apparatus optimized for a flash memory according to an exemplary embodiment of the present invention.

Advantages and features of the present invention and methods of accomplishing the same may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIG. 1 is a view illustrating the construction of an input/output control apparatus optimized for a flash memory according to an exemplary embodiment of the present invention.

As illustrated in FIG. 1, the input/output control apparatus optimized for a flash memory according to an exemplary embodiment of the present invention includes a flash memory 10, a file system 12, a write operation control unit 14, and a read operation control unit 16. The input/output control apparatus optimized for a flash memory may be implemented in a computer, a digital TV, a cellular phone, a Personal Digital Assistant (PDA), a Portable Multimedia Player (PMP), a digital camera, an MP3 player, and so forth, but its implementation is not limited thereto.

The flash memory 10 is a nonvolatile memory that is composed of blocks which correspond to a basic unit of a delete operation. The block is composed of several sectors which correspond to a basic unit of a write/read operation. Examples of storage devices to which such a flash memory is applied are USB Flash Drive (UFD), Solid State Disk (SSD), Multi-Media Card (MMC), and so forth.

Figure 2:
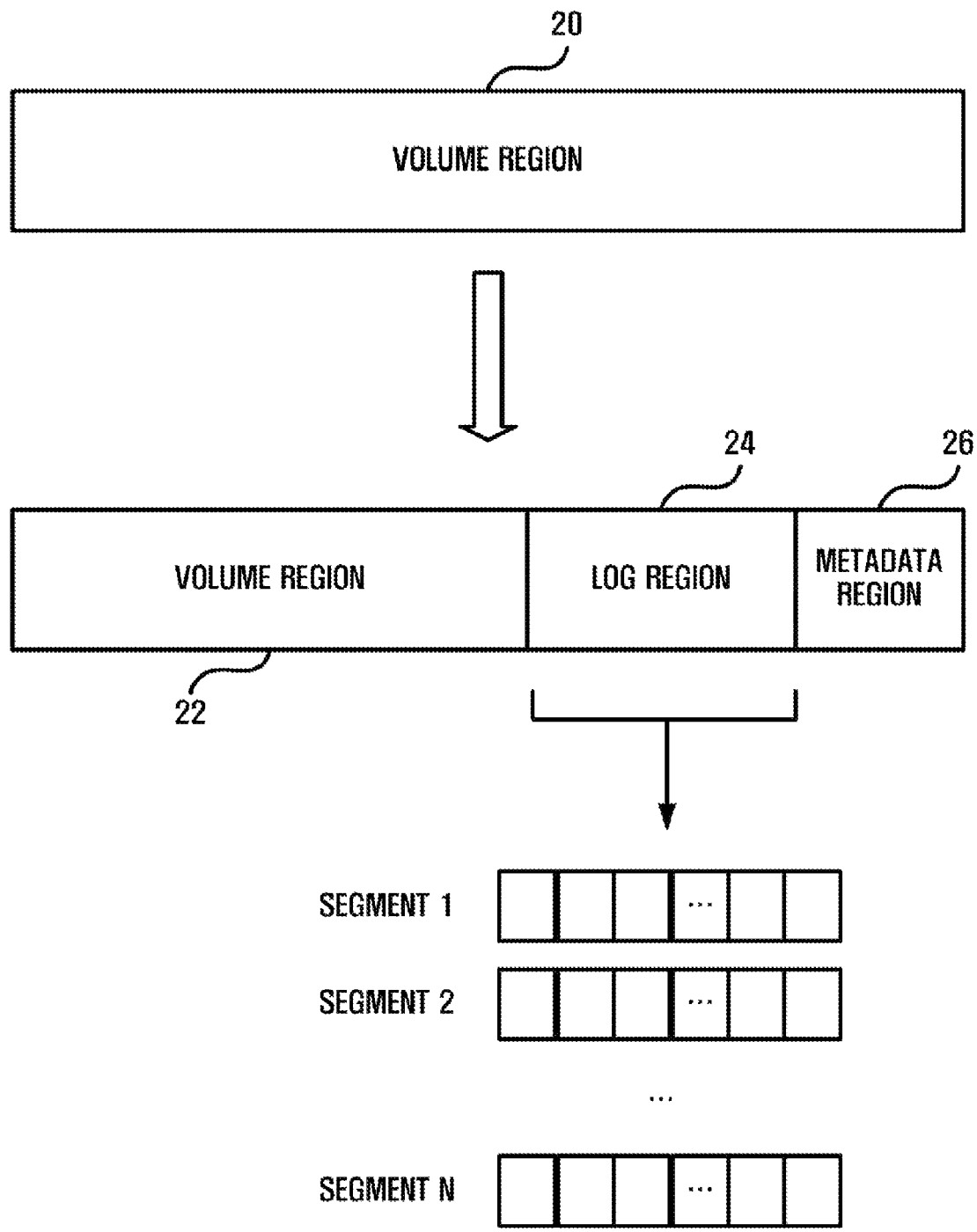
FIG. 2 is a view illustrating logical allocation regions of a flash memory according to an exemplary embodiment of the present invention.

In the present exemplary embodiment, the flash memory 10, as illustrated in FIG. 2, may be logically divided into a volume region 22, a log region 24, and a metadata region 26. That is, in the embodiment of the present invention, the size of the volume region 22 allocated to the existing flash memory 10 is adjusted, and the resultant remaining space is allocated as the log region 24 and the metadata region 26.

Data blocks, which are the subject of write/read operations, are stored in the volume region 22 and the log region 24. In the related art, all data blocks, of which the write operation is requested, are stored in the volume region 20, but in the case of data blocks of which the random write is requested, the data blocks are randomly written in the volume region 20 which causes a performance deterioration. In the present exemplary invention, the data blocks are successively written in the log region 24. In this case, it is sufficient that the data blocks are successively written only in segments of the log region 24 (described later).

The log region 24 is composed of a plurality of segments, and the size of the segment is determined in the unit of a physical operation of the flash memory 10 (e.g., the size of the log block of the existing flash translation layer), in the unit of a superblock of the flash translation layer, or in the unit of a multiple thereof, in order to maximize the performance of the flash memory 10.

The respective segment may be in a clean state that 0% effective data blocks exists in the stored data blocks, or in a dirty state that x % (where x is a positive number) effective data blocks exists in the stored data blocks. Lists of segments in the clean state (hereinafter referred to as "cleans list") and lists of segments in the dirty state (hereinafter referred to as "dirty list") are stored and managed. Also, at least one of the dirty lists is stored as a flush list if no clean list exists. This flush list is utilized as a list of data blocks to be deleted in a garbage collection (described later). In addition to the storing of the flush list when no clean list exists, the flush list may be periodically or non-periodically updated.

The metadata region 26 is a region where metadata is stored, and such metadata may include mapping information related to the log region 24. The mapping information related to the log region 24 is created when a data block is written in the log region 24. Specifically, the mapping information related to the log region 24 may include mapping information between the logical address and the physical address of the log region 24 in which the actual data block is written, mapping information between the physical address of the log region 24 in which the actual data block is written and the physical address of the volume region 22 in which the data block should be originally written before the application of the present invention.

Basically, if the requested logical address does not exist in the mapping information, the physical address that corresponds to the requested logical address is identical to the requested logical address.

Here, the mapping information is managed in a tree structure, and thus the insertion, deletion, and update of the mapping information can be easily performed.

In contrast, since the volume region 22, the log region 24, and the metadata region 26 are logically divided regions, they may be arranged successively or non-successively.

The file system 12 receives a write/read request from an application, and transfers a write/read-requested logical sector number (LSN) to the write operation control unit 14 or the read operation control unit 16.

The write operation control unit 14 or the read operation control unit 16 translates the write/read request for the logical address into a write/read request for the physical address.

That is, the write operation control unit 14 or the read operation control unit 16 performs the write/read operation by translating the request for the logical sector into the physical address of the flash memory 10.

The detailed operation of the write operation control unit 14 and the read operation control unit 16 will be described with reference to FIGS. 3 and 7.

Figure 3:
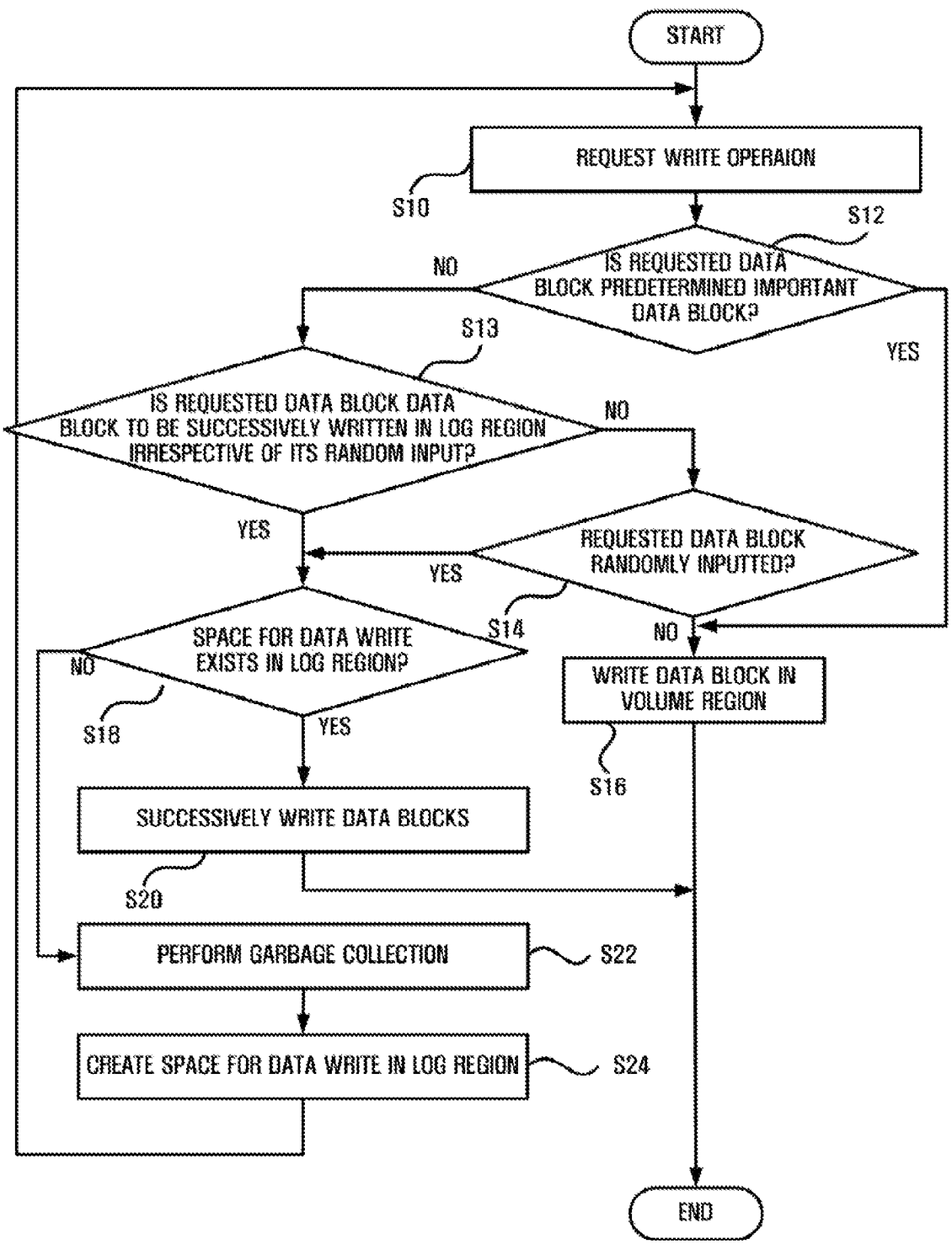
FIG. 3 is a flowchart illustrating a write operation process of a write operation control unit according to an exemplary embodiment of the present invention.

FIG. 3 is a flowchart illustrating the write operation process of the write operation control unit according to an exemplary embodiment of the present invention.

As illustrated in FIG. 3, if a write operation for a data block having a specified logical sector number is requested from the file system 12 S10, the write operation control unit 14 judges whether the requested data block is a predetermined important data block S12. Here, the predetermined important data block includes information that can be used to restore the file system 12 if the system is abnormally ended or a trouble occurs in the system. For example, the predetermined important data block may include journal in the metadata of the file system 12.

If it is judged that the write-requested data block is the predetermined important data block, the write operation control unit 14 writes the data block in the physical sector number (i.e., the requested logical sector number) of the volume region 22 that corresponds to the requested logical sector number. Accordingly, the data block is written in the volume region 22 of the flash memory 10 S16.

In contrast, if it is judged that that the write-requested data block is not the predetermined important data block, the write operation control unit 14 judges whether the write-requested data block is the data block to be successively written to in the log region 24, irrespective of whether the data block is randomly inputted S13. Here, the data block that should be successively written in the log region 24, irrespective of whether the data block is randomly inputted, may be a part of the metadata (i.e., the metadata (e.g., journal)) set as the predetermined important data block may be excluded.) of the file system. For example, in the case of EXT3, the metadata is briefly divided into the journal and general metadata, and it is preferable to successively write the general metadata in the log region 24 irrespective of whether the data is randomly inputted. A method of successively writing data blocks in the log region 24 will be described later.

In contrast, if it is judged that the write-requested data block is not the data blocks that should be successively written in the log region 24 irrespective of whether the data block is randomly inputted, the write operation control unit 14 confirms whether the data block is successively inputted or randomly inputted S14.

Specifically, a method of judging whether the data block is successively inputted or randomly inputted will be described in more detail.

First, it is assumed that a logical sector number for which the write operation is requested includes information such as "(a start number of logical sectors, the number of logical sectors)".

For example, if the logical sector number for which the write operation was previously requested is (n, m), and the logical sector number for which the write operation is presently requested is (n+m, i), the write operation control unit 14 judges that the data block is successively inputted.

That is, if no empty sector exists between the logical sector for which the write operation was previously requested and the logical sector for which the write operation is presently requested, it means that the data block which the write operation is requested is successively inputted. If an empty sector exists, it means that the data block which the write operation is requested is randomly inputted.

Figure 4:
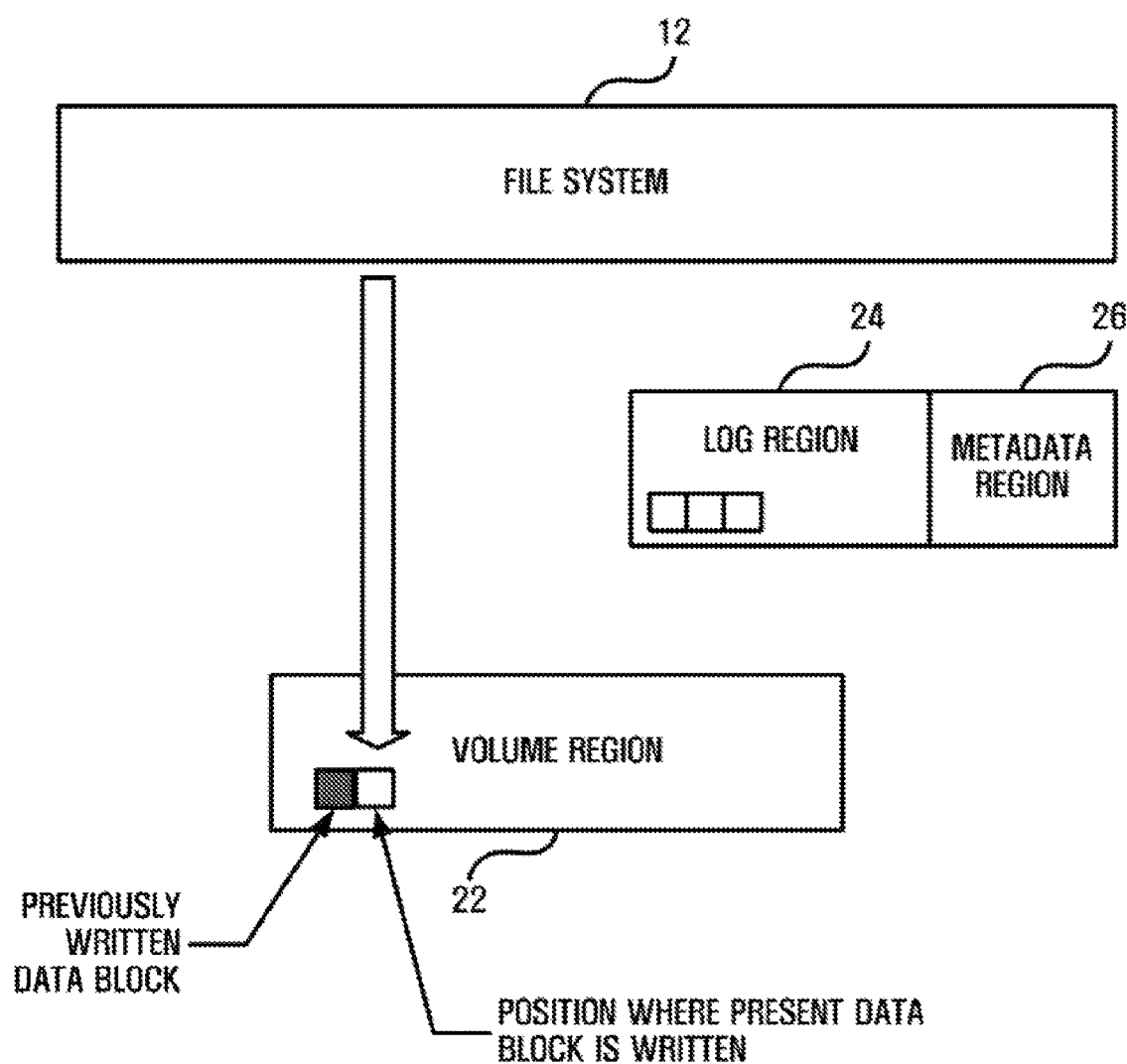
FIGS. 4 to 6 are views illustrating examples of write operations according to an exemplary embodiment of the present invention.

If it is confirmed that the data block is successively inputted, the write operation control unit 14 writes the data block in the physical sector of the volume region 22 that corresponds to the requested logical sector S16. In this case, the corresponding physical sector number is identical to the requested logical sector number as described above, and thus as illustrated in FIG. 4, the present data block is written in the volume region 22 of the flash memory 10, following the previous write-requested data block.

Figure 5:
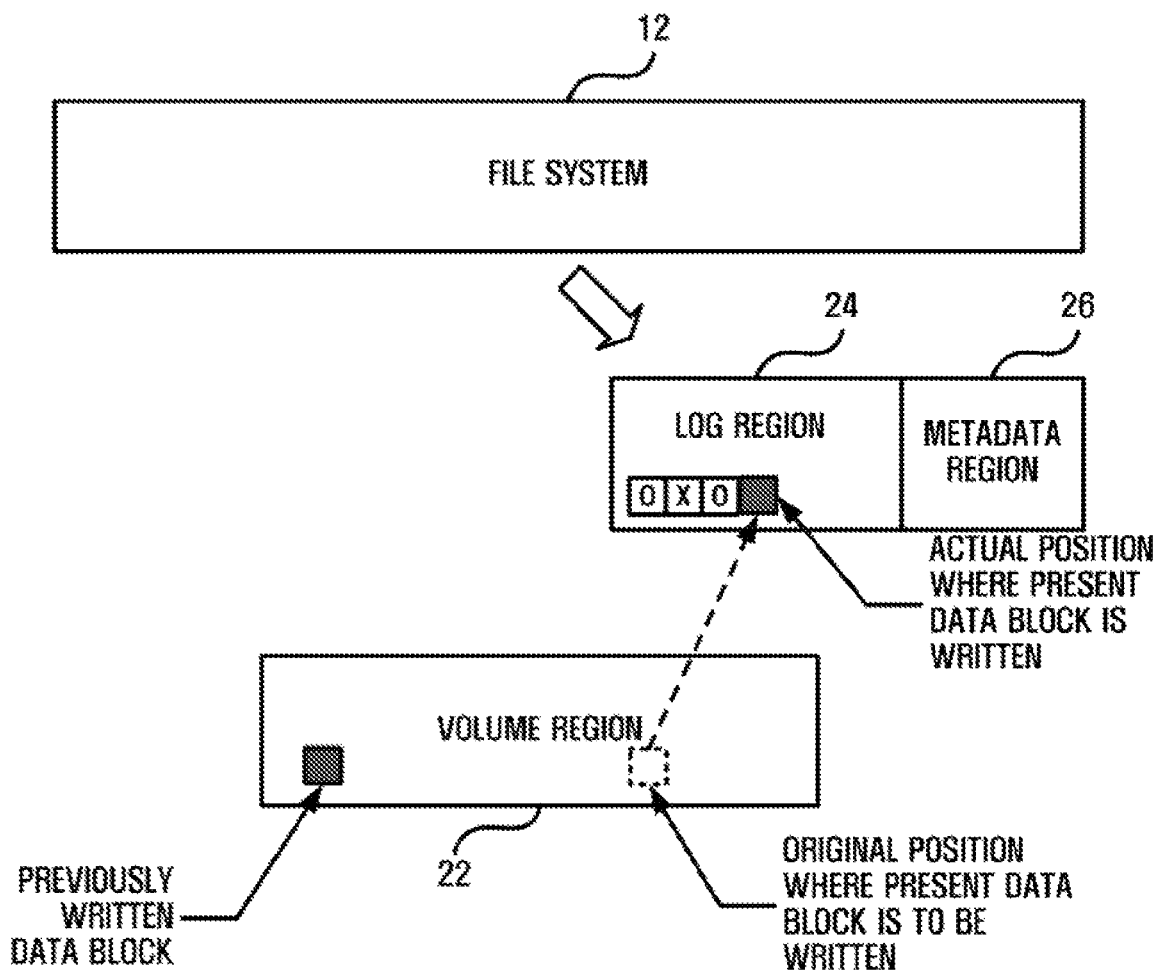

In contrast, if it is confirmed that the data block of which the write operation is requested is randomly inputted, the write operation control unit 14 judges whether a space for data write exists in the log region 24 S18. Specifically, the write operation control unit 14 confirms whether a clean list exists. If the clean list exists, the write operation control unit 14 successively writes the data block in at least one segment of the clean list as illustrated in FIG. 5 S20. For this, the write operation control unit 14 translates the write-requested logical sector number into the physical sector number in the clean segment, and writes the data block in the translated physical sector number. Then, the write operation control unit 14 updates the mapping information existing in the metadata region 26. Consequently, even if the random write is requested, the write operation control unit 14 successively writes the data block in the segment of the log region 24, and thus the performance of the flash memory 10 can be improved.

Figure 6:
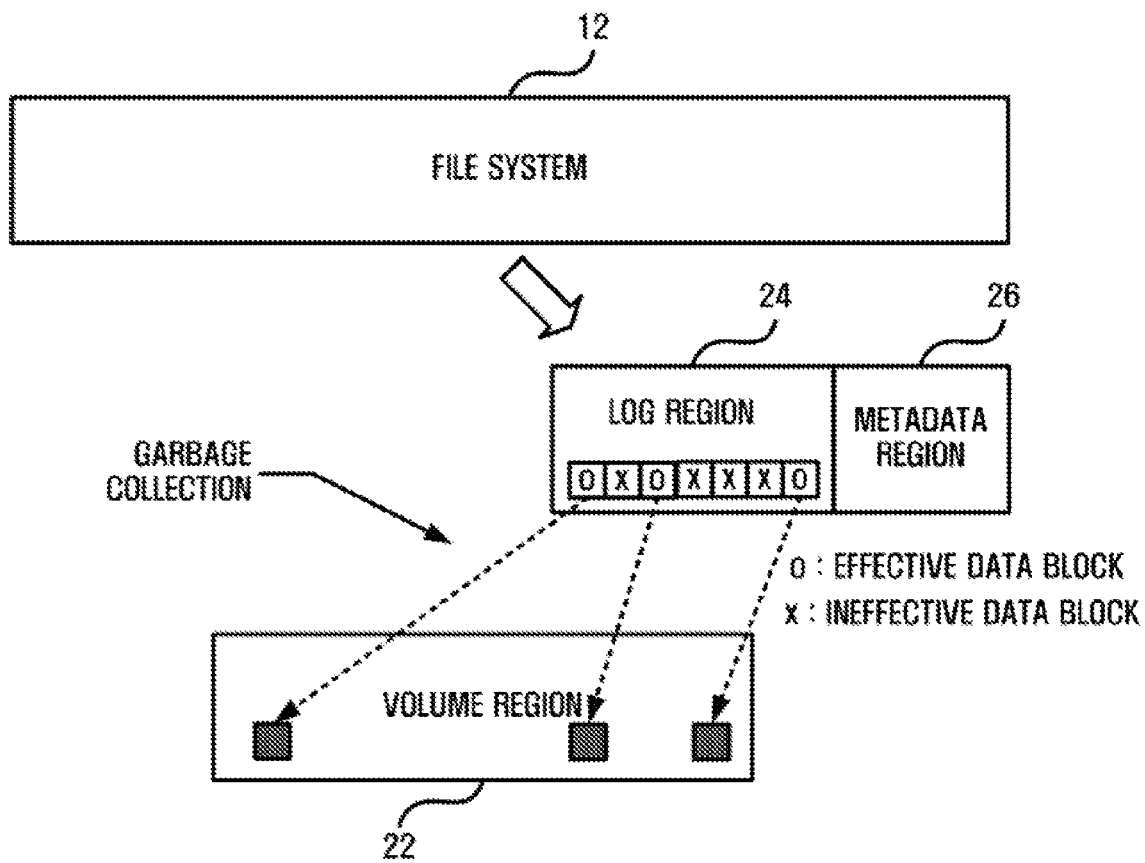

If no space for data write exists in the log region 24, for example, if no clean list exists, the write operation control unit 14 stores at least one dirty segment of a dirty list as a flush list. Then, as illustrated in FIG. 6, the write operation control unit 14 creates a space (e.g., a clean segment) for data write in the log region 24 by performing a garbage collection S22 and S24. At this time, an effective data block in the log region 24 is written at its original position of the volume region 22 on the basis of the mapping information of the metadata region 26, and the corresponding mapping information is updated. Thereafter, if the write operation is requested again, the above-described process is repeated.

If a random write operation is requested while the garbage collection is performed, the data block can be randomly written in the volume region in the same manner as the conventional method. However, if the garbage collection is completed, the random write operation is not performed again.

Figure 7:
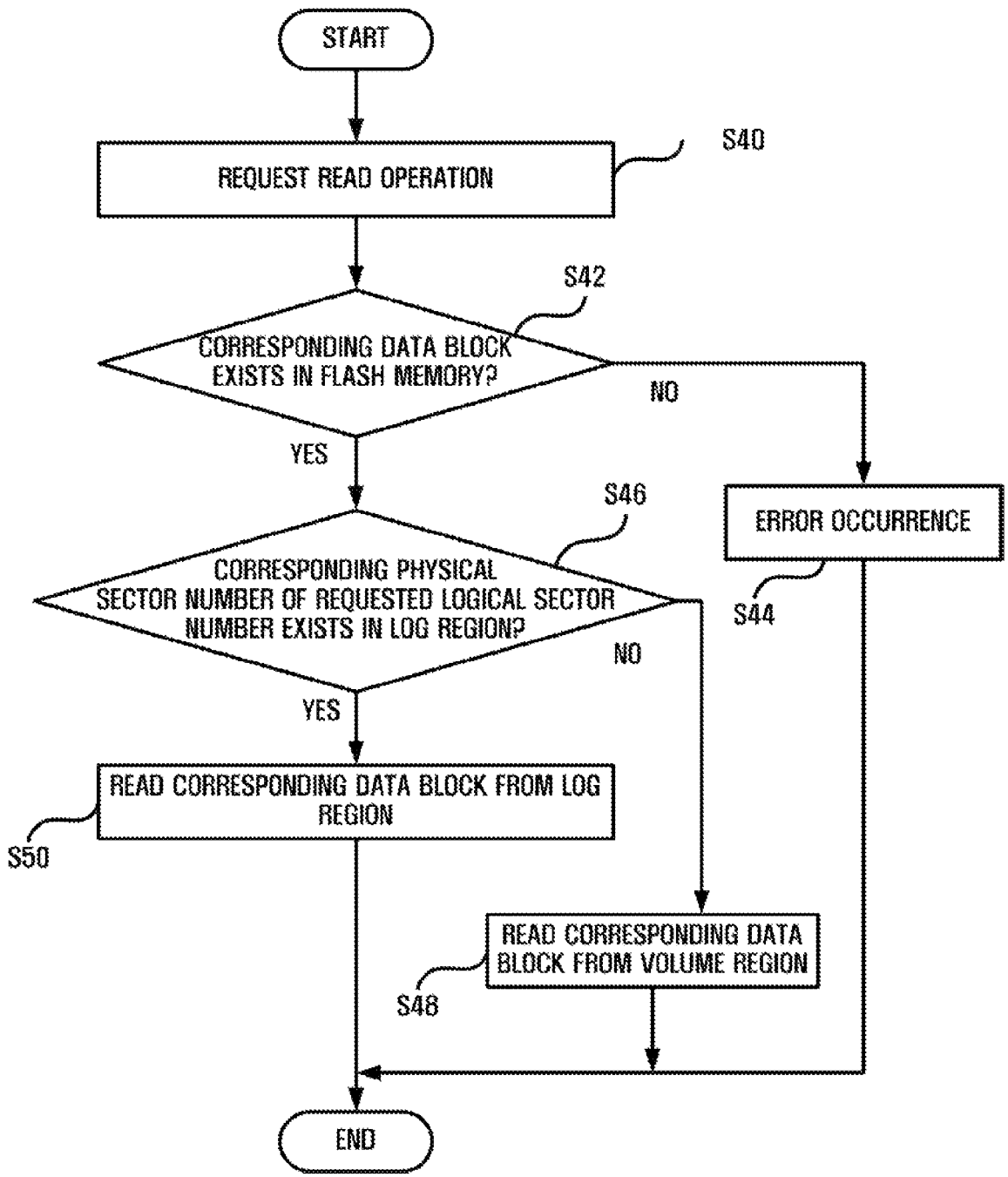
FIG. 7 is a flowchart illustrating a read operation process of a read operation control unit according to an exemplary embodiment of the present invention.

FIG. 7 is a flowchart illustrating the read operation process of the read operation control unit 16 according to an exemplary embodiment of the present invention.

As illustrated in FIG. 7, if a read operation for a data block having a specified logical sector number is requested from the file system 12 S40, the read operation control unit 16 judges whether the corresponding data block exists in the flash memory 10 with reference to metadata in the metadata region 26 S42.

If the corresponding data block does not exist in the flash memory 10, the read operation control unit 16 generates an error S44, while if the corresponding data block exists in the flash memory 10, it judges whether the corresponding physical sector number of the requested logical sector number exists in the volume region 22 or in the log region 24 of the flash memory 10 S46. For this, the read operation control unit 16 refers to the mapping information existing in the metadata region 26 of the flash memory 10. As described above, the mapping information is managed in a tree structure, and thus the read operation control unit 16 can rapidly access the mapping information.

The read operation may be for the data block having one or two logical sector numbers.

Figure 8:
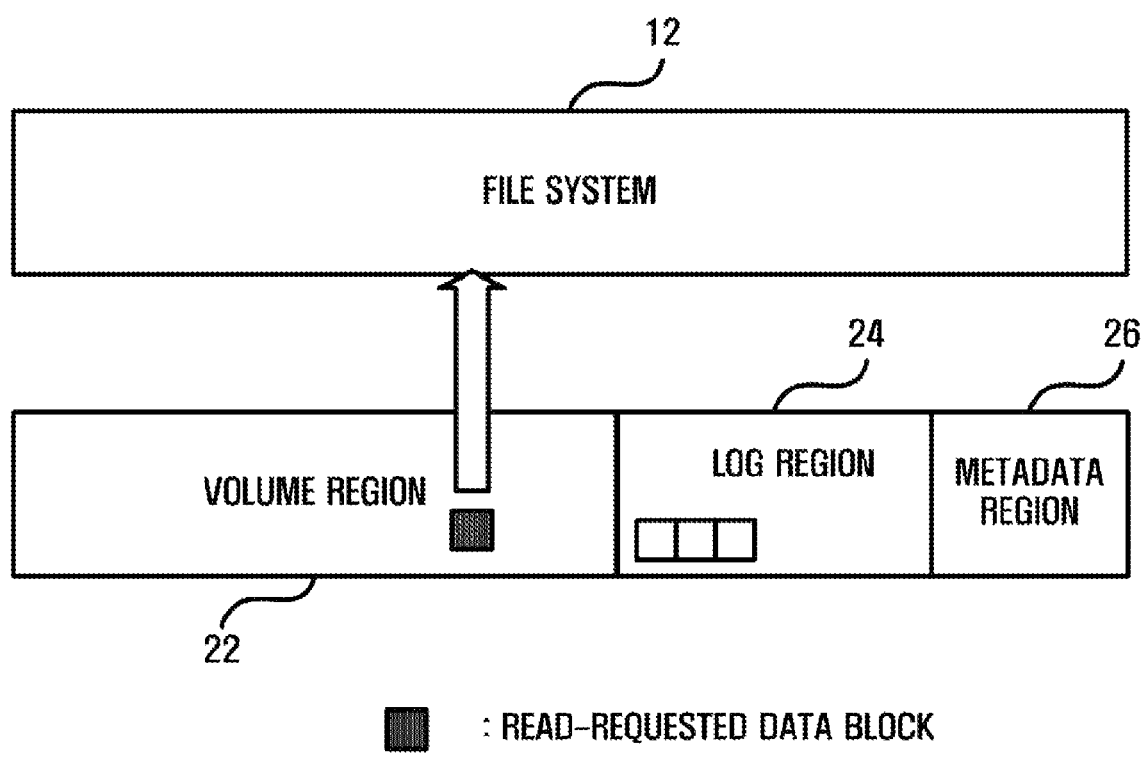
FIGS. 8 to 10 are views illustrating examples of read operations according to an exemplary embodiment of the present invention.

If it is judged that the corresponding physical sector number of the requested logical sector number exists only in the volume region 22 of the flash memory 10, the read operation control unit 16 reads the data block from the corresponding physical sector number of the volume region 22 of the flash memory 10 as illustrated in FIG. 8 S48.

Figure 9:
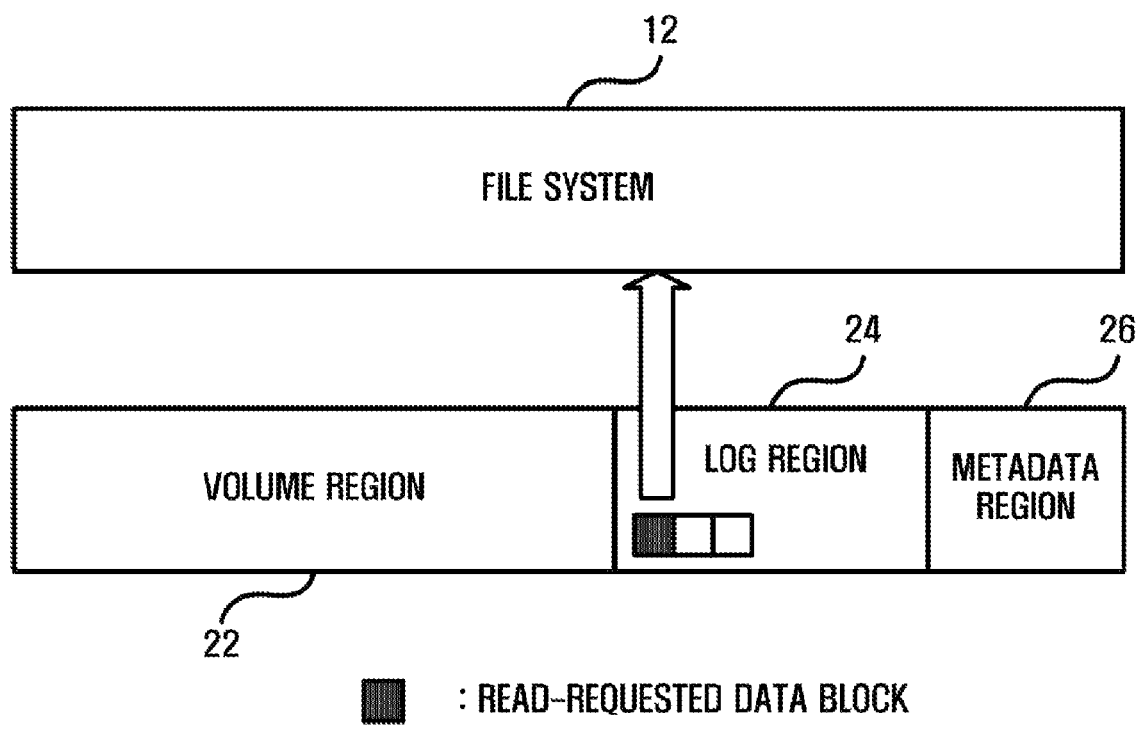

In contrast, if it is judged that the corresponding physical sector number of the requested logical sector number exists only in the log region 24 of the flash memory 10, the read operation control unit 16 reads the data block from the corresponding physical sector number of the log region 24 of the flash memory 10 as illustrated in FIG. 9 S50.

Figure 10:
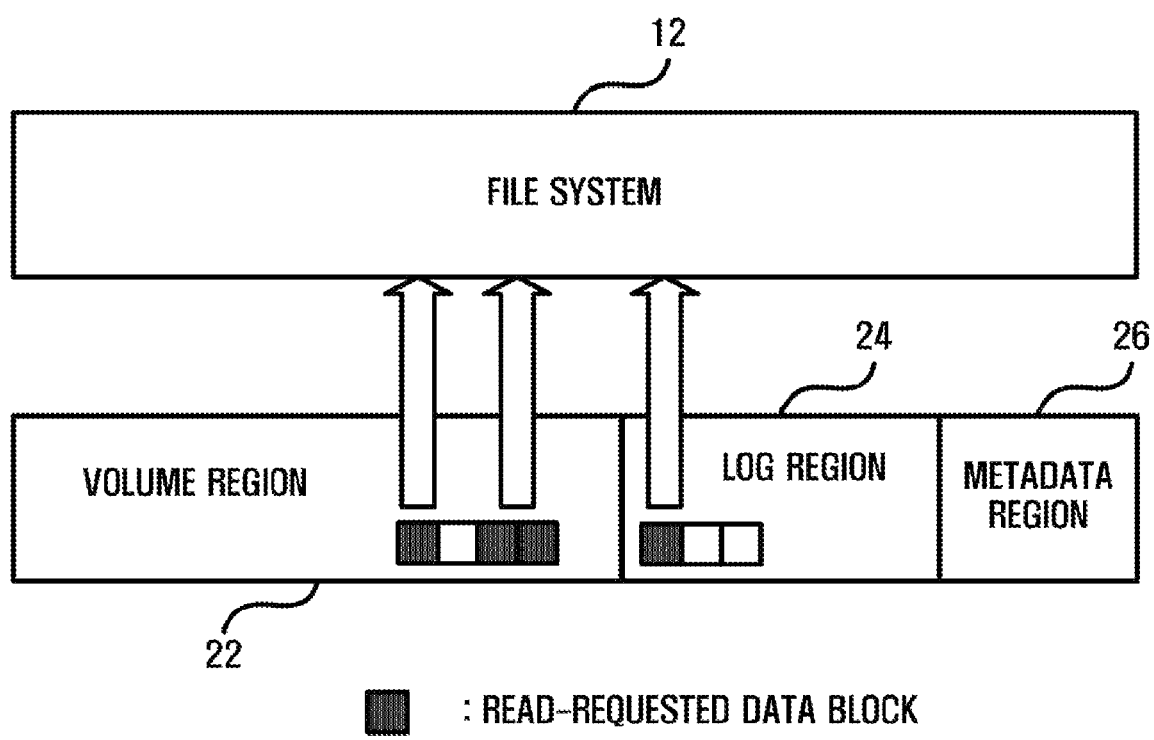

In addition, if it is judged that the corresponding physical sector number of the requested logical sector number exists in both the volume region 22 and the log region 24 of the flash memory 10 (this case refers to the read operation for the data block having two or more logical sector numbers), the read operation control unit 16 reads the data block from the corresponding physical sector number of the volume region 22 and the log region 24 of the flash memory 10 as illustrated in FIG. 10.

The write operation control unit 14 and the read operation control unit 16 may be implemented as one or two and more layers, or a layer in which the write operation control unit 14 and the read operation control unit 16 are integrated. In addition, the write operation control unit 14 and the read operation control unit 16 may be implemented in the file system 12 or the flash memory 10.

In the exemplary embodiments of the invention, it is exemplified that the write operation control unit 14 and the read operation control unit 16 perform write/read operations requested by the file system 12. However, since the write operation control unit 14 and the read operation control unit 16 can perform the write/read operations even if a PC recognizes the flash memory 10, without the file system 12, in a USB Mass Storage (UMS) form through a USB connection, they can optimize the input/output (I/O) pattern to be suitable to the flash memory 10 in diverse environments.

Also, in the exemplary embodiments of the present invention, the expression "data block" has been used. However, this is merely exemplary, and is not limited to the data write/read request in the unit of a block.

As described above, according to the exemplary embodiment of the present invention, data is successively written in the log region of the flash memory when a random write occurs in the flash memory, and thus the performance of the flash memory according to the random write can be improved.

Although exemplary embodiments of the present invention have been described for illustrative purposes, those skilled in the art will appreciate that various modifications, additions and substitutions are possible, without departing from the scope and spirit of the invention as disclosed in the accompanying claims. The foregoing embodiments are merely exemplary and are not to be construed as limiting the present invention. Therefore, the scope of the present invention should be defined by the accompanying claims and their legal equivalents.

What is claimed is:

1. An input/output control method optimized for a flash memory using an apparatus for optimizing a request for a write operation from a file system for the flash memory and transmitting the optimized request to the flash memory, the input/output control method comprising:

logically dividing the flash memory into a first region that indicates a volume region and a second region that indicates a predetermined surplus region;

judging whether a random write operation or a successive write operation of data occurs in the flash memory;

successively writing randomly input data in the second region of the flash memory if it is judged that the random write operation occurs; and successively writing data in the first region of the flash memory if it is judged that the successive write operation occurs, wherein the flash memory is further logically divided into a third region storing metadata, and the metadata includes mapping information between a logical address and a physical address in which actual data is written, and mapping information between a physical address of the second region in which the data is actually written and a physical address of the first region in which the data should be originally written.

2. The method of claim 1, wherein the judging comprises judging that the random write operation occurs if an empty sector exists between a logical sector for which the write operation was previously requested and a logical sector for which the write operation is presently requested, and judging that the successive write operation occurs if no empty sector exists.

3. The method of claim 1, wherein the predetermined surplus region is composed of a plurality of segments, and a size of the respective segment is determined in the unit of any one of a physical operation of the flash memory, a superblock of a flash translation layer, and multiples thereof.

4. The method of claim 3, wherein the successively writing the randomly input data comprises successively writing the data in the segment.

5. The method of claim 3, wherein the respective segment is in a clean state where 0% effective data blocks exist in the stored data, or in a dirty state where x % (where x is a positive number) effective data exists in the stored data;

wherein the method further comprises storing and managing lists of segments in the clean state and lists of segments in the dirty state.

6. The method of claim 5, further comprising:

checking whether the list of segments in the clean state exists if it is judged that the random write operation occurs; and successively writing the data in at least one segment in the clean state if the list of segments in the clean state exists.

7. The method of claim 6, further comprising:

storing at least one segment in the dirty state as a flush list if the list of segments in the clean state does not exist; and translating the segment in the dirty state into the segment in the clean state with reference to the flush list.

8. The method of claim 7, wherein the translating comprises writing effective data written in the predetermined surplus region in the volume region that is logically divided from the predetermined surplus region.

9. The method of claim 8, further comprising randomly writing the randomly input data in the volume region if the random write operation occurs during translation of the segment in the dirty state into the segment in the clean state.

10. The method of claim 1, wherein the mapping information is managed in a tree structure, and updated in real time.

11. The method of claim 1, further comprising reading data from at least one of the first region and the second region if a read operation for the corresponding data occurs in the flash memory.

12. The method of claim 1, further comprising:
judging whether the data subject to the random write operation is predetermined important data; and
writing the data in the first region if the data is the predetermined important data.

13. The method of claim 12, wherein the predetermined important data includes information that can be used to restore a file system if the system is abnormally ended or problems occur in the system.

14. The method of claim 1, further comprising making at least a part of the predetermined surplus region in a clean state if the predetermined surplus region is not empty.

15. An input/output control apparatus optimized for a flash memory, the input/output control apparatus optimizing a request for a write operation from a file system for the flash memory and transmitting the optimized request to the flash memory, the input/output control apparatus comprising:
a flash memory which stores data therein and is logically divided into a first region that indicates a volume region and a second region that indicates a predetermined surplus region; and
a write operation control unit which judges whether a random write operation or a successive write operation of data occurs in the flash memory, successively writes randomly input data in the second region of the flash memory if it is judged that the random write operation occurs, and successively writes data in the first region of the flash memory if it is judged that the successive write operation occurs,
wherein the flash memory is further logically divided into a third region storing metadata, and
the metadata includes mapping information between a logical address and a physical address in which actual data is written, and mapping information between a physical address of the second region in which the data is actually written and a physical address of the first region in which the data should be originally written.

16. The apparatus of claim 15, wherein the write operation control unit judges that the random write operation occurs if an empty sector exists between a logical sector for which the write operation was previously requested and a logical sector for which the write operation is presently requested, and judges that the successive write operation occurs if no empty sector exists.

17. The apparatus of claim 15, wherein the predetermined surplus region is composed of a plurality of segments, and a size of the respective segment is determined in the unit of any one of a physical operation of the flash memory, a superblock of a flash translation layer, and multiples thereof.

18. The apparatus of claim 17, wherein the write operation control unit successively writes the randomly input data in the segment.

19. The apparatus of claim 17, wherein the respective segment is in a clean state where 0% effective data blocks exist in the stored data, or in a dirty state where x % (where x is a positive number) effective data exists in the stored data;
wherein the write operation control unit stores and manages lists of segments in the clean state and lists of segments in the dirty state.

20. The apparatus of claim 19, wherein the write operation control unit confirms that the list of segments in the clean state exists if it is judged that the random write operation occurs, and successively writes the data in at least one segment in the clean state if the list of segments in the clean state exists.

21. The apparatus of claim 20, wherein the write operation control unit stores at least one segment in the dirty state as a flush list if the list of segments in the clean state does not exist, and translates the segment in the dirty state into the segment in the clean state with reference to the flush list.

22. The apparatus of claim 21, wherein the write operation control unit writes effective data written in the predetermined surplus region in the volume region that is logically divided from the predetermined surplus region when translating the segment in the dirty state into the segment in the clean state.

23. The apparatus of claim 22, wherein the write operation control unit randomly writes the randomly input data in the volume region if the random write operation occurs during translation of the segment in the dirty state into the segment in the clean state.

24. The apparatus of claim 15, wherein the mapping information is managed in a tree structure, and updated in real time.

25. The apparatus of claim 15, further comprising a read operation control unit which reads data from at least one of the first region and the second region if a read operation for the corresponding data occurs in the flash memory.

26. The apparatus of claim 15, wherein the write operation control unit checks whether the data subject to the random write operation is predetermined important data, and writes the data in the first region if the data is the predetermined important data.

27. The apparatus of claim 26, wherein the predetermined important data includes information that can be used to restore a file system if the system is abnormally ended or problems occur in the system.

28. The apparatus of claim 15, wherein the write operation control unit makes at least a part of the predetermined surplus region in a clean state if the predetermined surplus region is not empty.

* * * * *